S. M. KINTNER.
ELECTRICAL MEASURING INSTRUMENT.
APPLICATION FILED MAR. 17, 1905.
959,551.
Patented May 31, 1910.
3 SHEETS—SHEET 2.
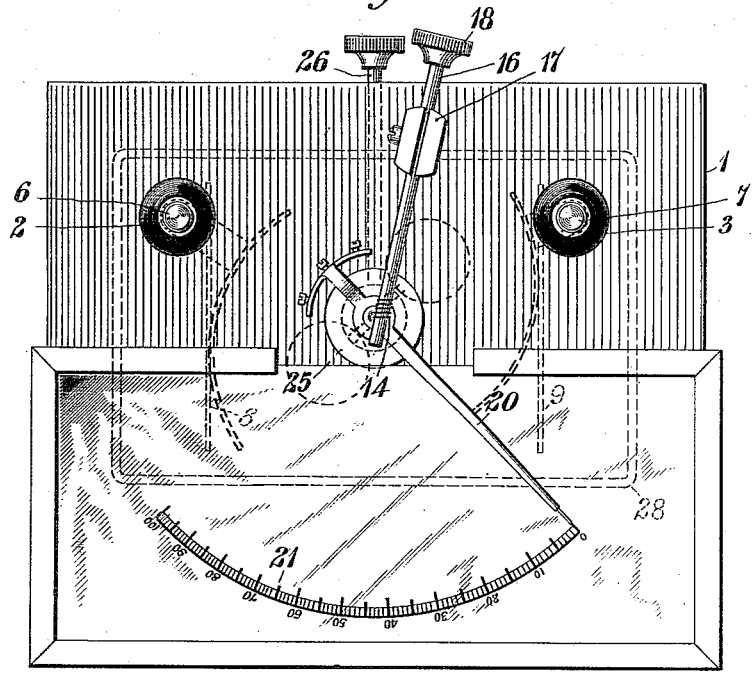
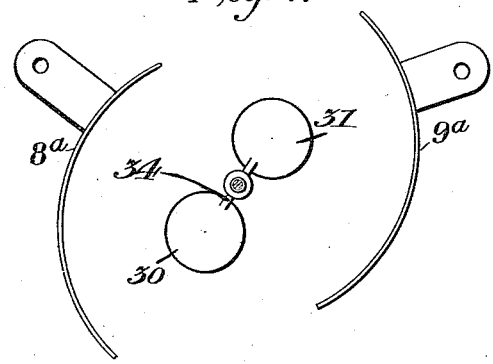
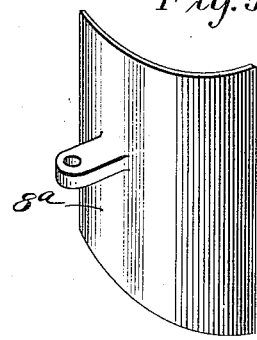
WITNESSES:
C. L. Belcher
Otto S. Schairer
INVENTOR
Samuel M. Kintner
BY
Wesley Glean
ATTORNEY S. M. KINTNER.
ELECTRICAL MEASURING INSTRUMENT.
APPLICATION FILED MAR. 17, 1905.
959,551.
Patented May 31, 1910.
3 SHEETS—SHEET 3.
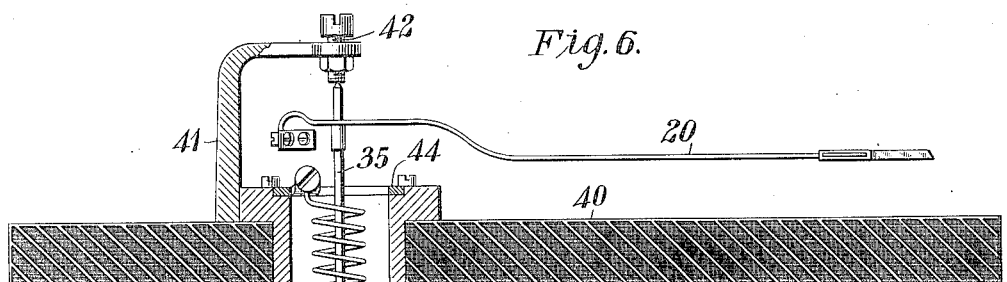
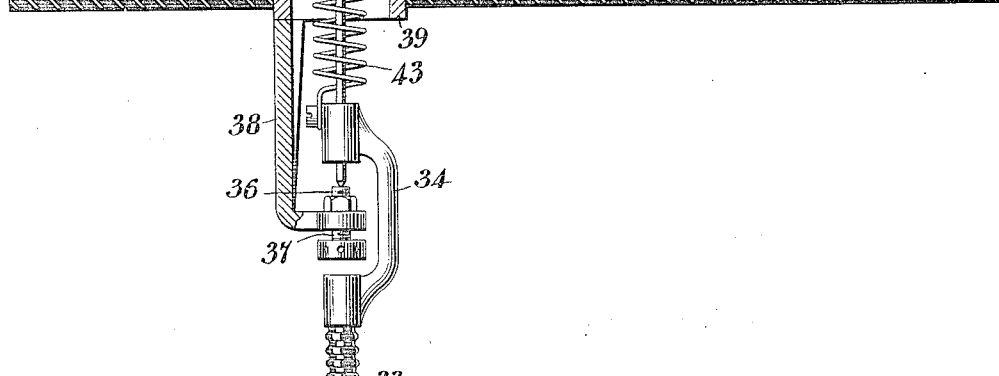
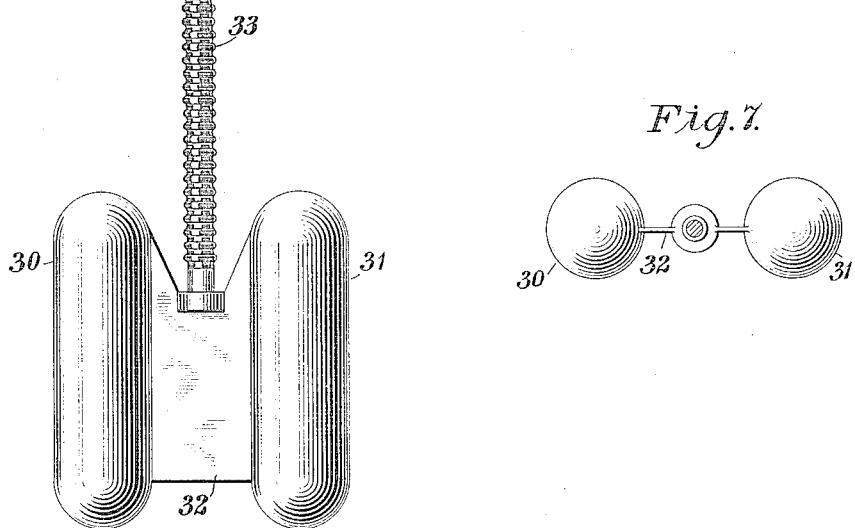
WITNESSES:
C. L. Belcher
Otto S. Schairer
INVENTOR
Samuel M. Kintner
BY
Wesley G. Carr
ATTORNEY

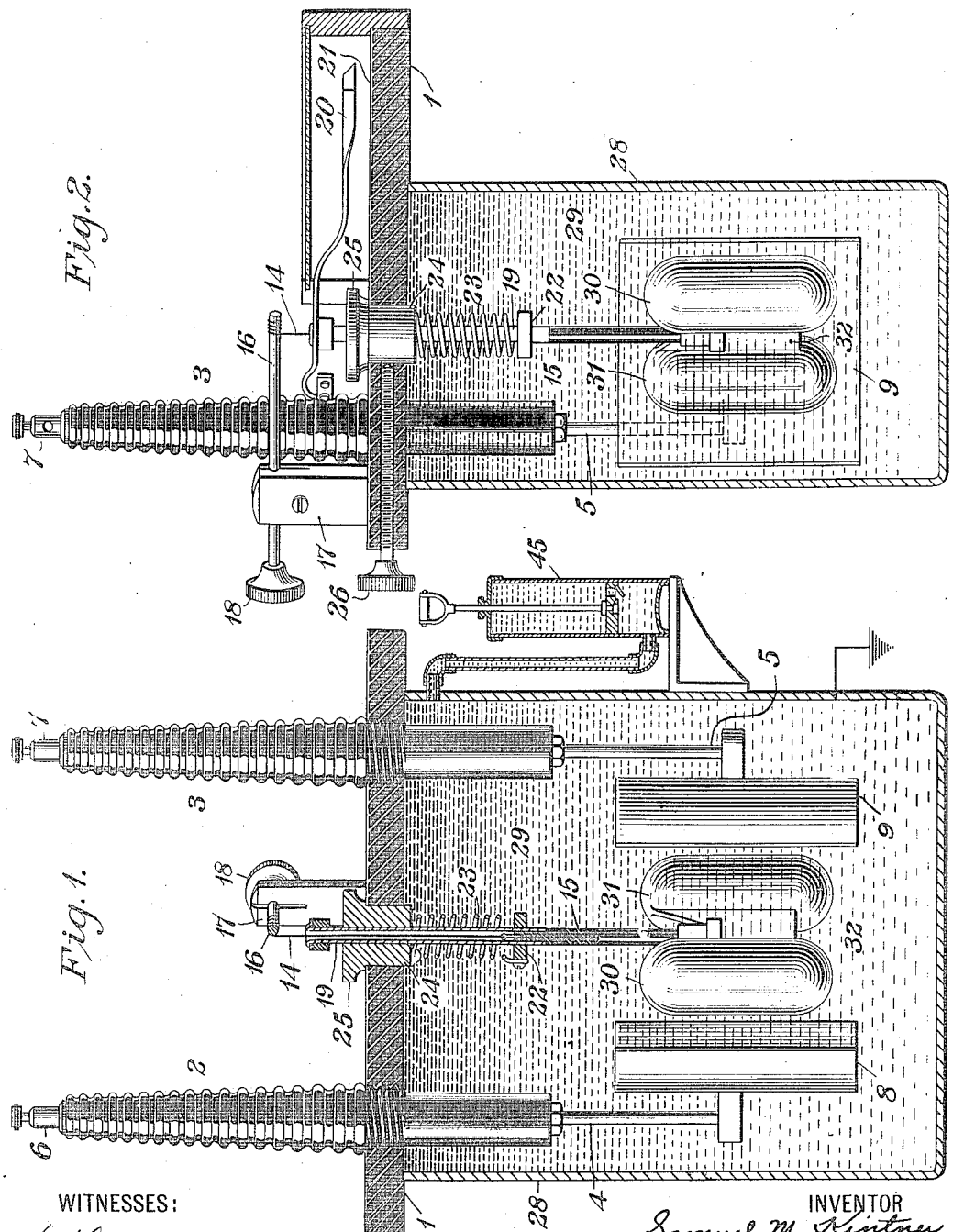

UNITED STATES PATENT OFFICE.

SAMUEL M. KINTNER, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

959,551.  Specification of Letters Patent.  Patented May 31, 1910.

Application filed March 17, 1905. Serial No. 250,642.

*To all whom it may concern:*

Be it known that I, SAMUEL M. KINTNER, a citizen of the United States, and a resident of Pittsburg, in the county of Allegheny and State of Pennsylvania, have invented a new and useful Improvement in Electrical Measuring Instruments, of which the following is a specification.

My invention relates to electrical measuring instruments, and it has for its object to provide means for improving the operation and for simplifying the construction of such instruments.

A further object is to provide an improved form of electrostatic instrument which shall be especially well adapted to the measurement of high voltages.

My invention is illustrated in the accompanying drawings, in which—

Figure 1 is a transverse, sectional view of an instrument constructed in accordance therewith. Fig. 2 is a view, partially in side elevation and partially in section, of the instrument shown in Fig. 1. Fig. 3 is a top plan view of the instrument shown in Fig. 1. Fig. 4 is a plan view of certain of the parts of the instrument embodying my invention. Fig. 5 is a view, in perspective, of one of the parts shown in Fig. 4. Fig. 6 is a view, partially in section and partially in side elevation, of a slightly modified structure and Fig. 7 is a plan view of certain of the parts of the instrument shown in Fig. 6.

An insulating slab 1 is provided with apertures, in which tubular insulators 2 and 3 are secured. Conducting rods 4 and 5 that are provided respectively with binding posts 6 and 7 at their upper ends and cylindrically curved conducting plates 8 and 9 at their lower ends, project through and are supported by the insulators 2 and 3. Suspended between the plates 8 and 9, is a body 10, preferably of conducting material, that comprises two elongated shells 30 and 31 having vertical axes and connected together by a vane 32. A suspension fiber 14 is attached, at its lower end, to an insulating rod 15, one end of which is secured to the vane 32 of the body 10. The upper end of the fiber is wound about one end of a rod 16, that has bearings in a suitable post 17, the other end of the rod being provided with a milled head 18 that is conveniently located and by means of which the body 10 may be adjusted vertically. The suspension fiber 14 is surrounded by a tube 19 that is connected, at its lower end, to the insulating rod 15 and that carries, at its upper end, a pointer 20 which moves over a dial 21 located on the upper side of the insulating slab 1. A collar 22 is rigidly secured to the tube 19 and one end of a coil-spring 23 is attached thereto, the other end of the spring being attached to a bushing 24 that fits in an aperture in the slab 1 and is provided with a milled head 25. The angular position of the body 10, with respect to the plates 8 and 9, and the tension of the spring 23 may be adjusted by means of the milled head 25. After adjustment has been effected, rotation or other movement of the tubular piece 24 may be prevented by means of a set-screw 26. The insulating slab 1 is supported upon a metallic receptacle 28 that contains an insulating fluid 29, preferably of higher specific inductive capacity than air which may be confined under pressure, if desired, and in which the plates 8 and 9 and the suspended, elongated body 10 are immersed, and, if desired, the receptacle 28 may be connected to ground, as indicated in Fig. 1. If the fluid is to be maintained under pressure, suitable means, such as a pump 45 will be provided, whereby compression may be effected.

The employment of curved terminal plates 8 and 9 of approximately cylindrical contour, and arranged symmetrically with respect to the suspended body, substantially as indicated in Figs. 4 and 5, permits of the use of a uniform scale 21, since the forces which tend to cause rotation of the suspended body will vary approximately in proportion to the differences of potential that exist between the terminal plates.

While, as has been stated, the suspended member is composed preferably of conducting material and may then be made in the form of a shell that may be almost entirely or wholly supported by the insulating fluid, it may, if desired, be composed of any suitable insulating material, such as glass or porcelain that has a higher specific inductive capacity than that of the immersing fluid. In the use of insulating material, it will be found desirable and perhaps necessary to make the suspended body solid in order to provide sufficient conductivity for the static field through the member to cause the required amount of movement thereof, for a given change in voltage.

Referring now to Figs. 6 and 7, the lower end of an insulating rod 33 is secured to the vane 32 and the upper end to a hanger 34 that is supported by means of a spindle 35, the lower pointed end of which rests upon a jewel bearing 36, located in the end of a screw 37. The screw 37 is threaded through the laterally projecting end of a bracket arm 38 that is supported by a bushing 39 located in an aperture in the insulating slab 40. Supported by the bushing 39, or by any other suitable means, upon the upper side of the slab 40, is a bracket arm 41 which is provided, at its free end, with an adjustable screw 42 having a concave end for the reception of the upper pointed end of the spindle 35. A pointer 20 is carried by the spindle 35 and a coil-spring 43, the upper end of which is attached to a plate 44 that is adjustably secured to the bushing 39 and the lower end of which is secured to the hanger 34, surrounds the spindle 35 and provides means for maintaining the pointer normally in its zero position.

While certain specific forms of suspension means for the movable member have been shown and described, it should be understood that they are only generally illustrative, and that the movable element may be supported by any other character of suspension means having either a vertical or a horizontal axis as may be found most convenient to employ.

The insulating fluid in which the terminal plates and the conducting body are immersed performs certain important functions which have not heretofore pertained to instruments of this character. If oil or a similar liquid be employed, it will increase the insulation between the stationary and movable parts and thereby permit of a decrease in the size of the instrument required to measure given voltages below the sizes of instruments that would be required if air alone were depended upon for insulating purposes. As a consequence of the reduction in the distances between the terminal plates and the suspended body, a static field of greater density is established between the terminal plates and consequently greater forces exist, which tend to cause rotation of the suspended body.

The specific inductive capacity of the insulating fluid may be greater than that of air and an additional increase in the actuating forces may also be obtained from this cause over what could be obtained if the instrument parts were not immersed in fluid.

If the suspended part be properly proportioned its apparent weight may be greatly reduced, thereby increasing the sensitiveness of the instrument and reducing the wear upon the pivots or suspension devices. The insulating fluid permits of the use of a metallic receptacle, which may be grounded, as before indicated, thus screening the circuit terminals and the suspended member from all external static effects, an advantage over prior instruments, of considerable importance, in view of the fact that one of the most frequent troubles in the use of such static instruments has been due to external static effects.

The fluid dampens the oscillations of the suspended member, rendering the instrument dead beat, or nearly so, and for that reason, more satisfactory in practical operation. The damping effect exerted by the fluid may be increased by providing the movable member with vanes, and, if insufficient damping effect is afforded by the fluid, damping magnets may be employed, both expedients being well known in the art.

It will be understood that the insulating fluid in which the terminal plates and movable body are immersed may be either a non-conducting liquid or a gas that is confined under atmospheric pressure or any greater degree of pressure that may be practicable. It will generally be found desirable to compress any gas that may be employed and if air is utilized compression is necessary. The application of pressure to liquids is also advantageous in connection with their use for the purposes of my invention for the reason that their dielectric strengths are thereby increased. The application of such degree of pressure as may be found desirable may be made by any suitable means known in the art.

While I have shown and described an insulating fluid employed in combination with a specific form of static instrument, I desire to have my invention so construed as to cover the employment of an insulating fluid other than air, and preferably of higher specific inductive capacity, in all forms of electrostatic and electromagnetic instruments in which advantageous results may be derived from its use.

I claim as my invention:

1. The combination with curved plate circuit terminals having opposing faces and a vertically elongated conducting member rotatably suspended between the said faces, of a compressed insulating fluid in which the said parts are immersed, and a grounded metallic receptacle for the insulating fluid.

2. The combination with plate circuit terminals having opposing concave faces, and a vertically elongated hollow conducting member rotatably suspended between the said faces, of an insulating fluid in which the said parts are immersed, and a grounded metallic receptacle for the insulating fluid.

3. The combination with plate circuit terminals having concave opposing faces, and a vertically elongated member movably supported between the terminals, of a compressed insulating fluid in which said parts are immersed, and a grounded receptacle for the insulating fluid.

4. An electrical measuring instrument comprising vertically elongated and relatively movable members, a body of compressed fluid in which they are immersed, and a metallic receptacle for the fluid.

5. An electrical measuring instrument comprising vertically elongated and relatively movable members, a body of compressed fluid in which they are immersed, and a grounded receptacle for the fluid.

6. In an electrostatic measuring instrument, the combination with circuit terminals, a member rotatably supported between the terminals and comprising two elongated bodies having vertical axes, and a connecting vane for the bodies.

7. In an electrostatic measuring instrument, the combination with curved plate circuit terminals, and a member movably supported between the terminals and comprising a vane, and elongated bodies attached thereto with their longer axes vertical, of a compressed insulating fluid in which said parts are immersed.

8. In an electrostatic measuring instrument, the combination with curved plate circuit terminals, and a member movably supported between the terminals and comprising a vane, and elongated bodies attached thereto with their longer axes vertical, of an insulating fluid in which said parts are immersed, and a metallic receptacle for the fluid.

9. In an electrostatic measuring instrument, the combination with curved plate circuit terminals, and a member movably supported between the terminals and comprising a vane, and elongated bodies attached thereto with their longer axes vertical, of an insulating fluid in which said parts are immersed, and a grounded receptacle for the fluid.

10. The combination with a vertically elongated rotatable member, of two cylindrically-curved stationary plates located adjacent thereto and so arranged that the distances between the concave faces thereof and the movable member vary inversely with the movement of the movable member.

11. The combination with a vertically elongated rotatable member, of two curved plates located adjacent thereto and so arranged that the distances between the concave faces thereof and the movable member vary inversely with the movement of the movable member, and an insulating fluid in which said parts are immersed.

12. The combination with a vertically elongated rotatable member, of two cylindrically curved stationary plates located adjacent thereto and so arranged that the distances between the concave faces thereof and the movable member vary inversely with the movement of the movable member, and a compressed insulating fluid in which said parts are immersed.

13. The combination with a vertically elongated rotatable member, of two cylindrically curved stationary plates located adjacent thereto and so arranged that the distances between the concave faces thereof and the movable member vary inversely with the movement of the movable member, an insulating fluid in which said parts are immersed and a grounded receptacle therefor.

14. The combination with a vertically elongated rotatable member, of two cylindrically curved stationary plates located adjacent thereto and so arranged that the distances between the concave faces thereof and the movable member vary inversely with the movement of the movable member, a compressed insulating fluid in which said parts are immersed and a grounded metallic receptacle therefor.

15. The combination with a rotatable member comprising substantially cylindrical bodies the axes of which are arranged parallel to the axis of rotation of the member, of cylindrically curved stationary vanes the concave faces of which are arranged adjacent to the cylindrical bodies and so that the distances between them and the bodies vary inversely with the movement of the movable member.

16. The combination with cylindrically curved stationary vanes, of a member rotatably supported between the concave faces thereof and comprising substantially cylindrical, elongated bodies the longer axes of which are parallel to the axis of rotation of the member.

17. The combination with cylindrically curved stationary vanes, of a member rotatably supported between the concave faces thereof and comprising substantially cylindrical, elongated bodies the longer axes of which are parallel to the axis of rotation of the member, and an insulating fluid in which said parts are immersed.

18. The combination with cylindrically curved stationary vanes, a member rotatably supported between the concave faces thereof and comprising substantially cylindrical, elongated bodies the longer axes of which are parallel to the axis of rotation of the member, and a compressed insulating fluid in which said parts are immersed.

19. The combination with cylindrically curved stationary vanes, of a member rotatably supported between the concave faces thereof and comprising substantially cylindrical, elongated bodies the longer axes of which are parallel to the axis of rotation of the member, an insulating fluid in which said parts are immersed, and a grounded receptacle for the fluid.

In testimony whereof, I have hereunto subscribed my name this 15th day of March, 1905.

SAMUEL M. KINTNER.

Witnesses:
HENRY H. GALLEHER.
BIRNEY HINES.